United States Patent [19]

Grodde et al.

[11] Patent Number: 4,579,175
[45] Date of Patent: Apr. 1, 1986

[54] METHOD OF REDUCING WATER PRODUCTION

[75] Inventors: Karl-Heinz Grodde; Hartwig Volz, both of Celle, Fed. Rep. of Germany

[73] Assignee: Deutsche Texaco Aktiengesellschaft, Fed. Rep. of Germany

[21] Appl. No.: 639,639

[22] Filed: Aug. 10, 1984

[51] Int. Cl.$^4$ ............................................ E21B 33/138
[52] U.S. Cl. ................................. 166/295; 166/294; 166/300; 523/130
[58] Field of Search ............... 166/270, 294, 295, 300; 175/72; 252/8.5 LL; 523/130

[56] References Cited

U.S. PATENT DOCUMENTS

| 2,211,688 | 8/1940 | Byck et al. | 252/8.5 A |
| 2,747,839 | 5/1956 | Moore | 166/294 X |
| 3,032,499 | 5/1962 | Brown | 252/8.55 D X |
| 3,208,524 | 9/1965 | Horner et al. | 166/294 |
| 3,308,885 | 3/1967 | Sandiford | 166/295 |
| 3,615,794 | 10/1971 | Nimerick | 523/130 |
| 3,721,295 | 3/1973 | Bott | 166/295 |
| 3,868,999 | 3/1975 | Christopher, Jr. et al. | 166/292 |
| 4,022,633 | 5/1977 | Schneider | 166/294 X |
| 4,120,361 | 10/1978 | Threlkeld et al. | 166/294 X |

FOREIGN PATENT DOCUMENTS

| 1025806 | 9/1956 | Fed. Rep. of Germany . |
| 2358350 | 11/1973 | Fed. Rep. of Germany . |
| 945540 | 5/1962 | United Kingdom . |

*Primary Examiner*—George A. Suchfield
*Attorney, Agent, or Firm*—Jack H. Park; Kenneth R. Priem; Harold J. Delhommer

[57] ABSTRACT

The disclosed invention reduces water production substantially more than hydrocarbon production in producing wells by the injection of an aqueous solution of alginates. The alginate solution or following solutions may optionally contain agents for decelerating or accelerating gelling of the alginate.

7 Claims, No Drawings

METHOD OF REDUCING WATER PRODUCTION

BACKGROUND OF THE INVENTION

The present invention relates to a method of reducing water production in hydrocarbon wells. In particular, the method concerns the injection of aqueous solutions of alginates. The method is especially useful in formations having a high content of bivalent cations in the formation water.

As oil fields increase in age, the amount of water in the produced liquids normally increases until it reaches values which require that the production be discontinued for reasons of economy. The inflow of water to the production wells is caused by the expansion of the aquifer adjoining the oil field or, in the case of secondary recovery processes, by the injection of water into the injection wells.

There are three distinct cases of water production in hydrocarbon producing wells which vary according to the structure of the formation.

Case 1

In some formations only the upper portion of the formation contains oil and bottom water underlies the oil portion of the formation. Even in homogeneous permeable formations the water advances rapidly in the lower layers of the formation due to its normally higher mobility as compared to the oil. After the breakthrough of water, a water cone will be formed around the production well with increased oil/water contact and a rapid increase in the dilution of produced fluids by water.

Case 2

When the formation exhibits a higher permeability inhomogeneity, the water tends to finger through the oil, which in many cases has a much higher viscosity. Soon after the breakthrough of water in the production wells water will be the predominant flowing liquid. Oil in the less permeable layers will move only at a reduced velocity with a small pressure head causing the well production to be rapidly diluted.

Case 3

Finally, in most cases the water will not flow to the production wells from all sides but only from a small azimuth area which will increase in the course of the production period.

In a homogeneous layer the simultaneous flow of water and oil may be approximately described by the concept of a mobility ratio. Mobility is the quotient of permeability $k$ and viscosity $\mu$ of the respective phases. The mobility ratio $M$ is frequently expressed as the quotient of the water and oil mobilities, $$M = \frac{k \text{ eff } w}{\mu w} \Big/ \frac{k \text{ eff } o}{\mu o} \quad (1)$$

wherein k eff w is the effective permeability to water at residual oil content;

$\mu w$ is the viscosity of the water;

k eff o is the effective permeability to oil at retained water content; and $\mu o$ is the viscosity of the oil.

Some of the methods known so far relate to the blocking of bottom water (the above-specified first case). For instance, the lower, water-containing portion of the formation may be either cemented or blocked by means of packers. More advantageous methods involve the clogging or blocking of the water-containing layers up to several meters into the formation. For instance, the bottom water-containing portion of the formation may be injected with liquids which will gel after some time. A good example is water glass solutions which will solidify to form a rigid gel by the addition of an electrolyte such as hydrochloric acid or ammonium chloride after a certain incubation period. A serious drawback of this method is that upon penetration of these initially highly liquid solutions into petroleum containing layers, the oil producing layers will also be sealed and oil production will be blocked. Such a blocking practically cannot be undone.

For this reason increased efforts have been made towards the development of methods which inhibit the inflow of water to a greater extent than oil. In accordance with the mobility ratio equation, this means that the effective permeability to water, k eff w, is reduced to a greater extent than the effective permeability to oil, k eff o. U.S. Pat. No. 3,308,885 recommends the injection of water-soluble, partially hydrolyzed, high-molecular weight polyacrylamides. A similar approach is taken by German application No. 2,358,350 which describes the use of a mixture comprising a hydrocarbon solvent, colloidal silicon dioxide, a higher-molecular polymer such as partially hydrolyzed polyacrylamide, a surface-active agent and water for the same purpose.

According to U.S. Pat. No. 3,032,499, the water-containing layers may be selectively blocked by injection of a hydrocarbon solution of an acid addition of an N-alkyl-alkylenepolyamine. Finally, U.S. Pat. No. 3,721,295 recommends the use of water-in-oil emulsions with finely dispersed water soluble vinyl addition polymers.

Several references disclose the case of alginate solutions to form solid, cement-like plugs or sheaths. At high concentrations such as in the prior art and Example 1, alginates completely stop fluid production into the well or fluid loss from the wellbore, objectives completely at odds with the present invention which seeks to reduce water production without significantly decreasing hydrocarbon production.

U.S. Pat. No. 2,211,688 discloses the use of a treating fluid containing an alginate for stiffening and solidifying the borehole and for sealing off loose, unstable formations. Col. 5:44-5 describes the method of U.S. Pat. No. 2,211,688 as forming a "desired water and acid-insoluble plug within the formation". The cement-like effect of higher concentrations of alginates is shown by U.K. Pat. No. 945,540. U.K. Pat. No. 945,540 is directed to a method for solidifying soil with a grout consisting of alginates, cements, clays or muds. The patent suggests the use of an alginate grout to form the equivalent of foundation pilings without the need to drive conventional pilings.

U.S. Pat. No. 3,208,524 also employs a high concentration alginate solution to prevent the loss of drilling fluid during the drilling of a well. This creates a solid, cement-like sheath on the surface of the borehole.

West German Pat. No. 1,025,806 describes the injection of alginic acid salts and highly polymerized polyacrylates with a water-soluble urea-formaldehyde condensation product to achieve a complete plugging and solidification of certain parts of the formation.

In spite of the above efforts towards the blocking of water, none of the recited methods has been entirely satisfactory in practice. In part this is because the achieved water blocking effects are too insignificant and in part because the proposed methods can be performed in practice only with difficulty or at excessive expense. And the references which disclose the use of alginates only do so in high concentrations to seal off or completely plug that part of the formation with a solid, cement-like material. Such complete plugging methods are too impractical to use in most situations. Thus, there exists a demand for an easily performed and inexpensive method which may be used in all three of the above-specified cases of water inflow.

SUMMARY OF THE INVENTION

The invention method requires the injection of an aqueous solution of alginates at an alginate concentration of from 0.1 to 5.0 g/l, preferably 0.5 to 5 g/l. The alginate solution may optionally contain agents for decelerating or accelerating gelling of the alginate.

DETAILED DESCRIPTION

Alginates are alkali metal salts of alginic acid, a linear copolymer of D-manuronic acid and L-guluronic acid. They are obtained from algae and have molecular weights between about 30,000 and about 150,000 g/mole.

The aqueous solutions of sodium alginates have a relatively low viscosity at concentrations below 5 g/l and may readily be injected into formations of low permeability. Alginates form gels by cross-linking with multivalent cations. This behavior may be utilized in formations containing brine with a substantial divalent ion content (calcium and magnesium) or multivalent ion content. The alkaline earth ion content of more than 5 g/l in the formation waters of most German oil field is sufficient for cross-linking the alginate solutions. The alginates may be injected into the formation at low viscosity which will rapidly increase upon contact with the formation water to inhibit water production. No such cross-linking will occur upon contact with crude oil.

For the above-mentioned case 1, alginate solutions at a concentration of up to 5 g/l and more may be used. For cross-linking purposes, especially with relatively soft formation water, a solution of calcium chloride may be injected in a separate operation or with a solution of alginates or on an alternating basis with solutions of alginates. In order to achieve greater penetration depths, buffer solutions of substantially fresh water without cross-linking ions may also be injected between the solution of alginates and the cross-linking water solution.

To delay gelling, chemicals having a chelate-forming effect relative to the multivalent ions may be added to the solution of alginates. For economic reasons complex phosphates such as sodium hexametaphosphate or sodium tripolyphosphate are the delaying or decelerating agents of choice. But other chelating agents such as nitrilo-triacetic acid and the salts thereof, ethylenediamine tetraacetic acid and the salts thereof, and substantially the whole range of chelating agents known in the art may be used.

In addition to crude oil, nearly all petroleum containing formations also contain connate water, usually comprising between 10% and 20% of the pore volume. The alginate will also react with the cross-linking ions of the connate water.

Even if the alginate solutions must be injected into the petroleum containing layers as well as the water producing layers, the reduction in effective permeability to oil is surprisingly low. It is also true that the more highly viscous petroleum cannot be displaced as well as water. Thus, the penetration depth into the predominantly oil producing layers is less than in the diluted regions. In addition, only a part of the alginate solution will then contact the retained water and form a gel. The major amount of the alginate solution will be re-recovered without having gelled. In this case, the delaying effect of phosphates is advantageous.

In accordance with the invention, it is possible solely on account of this flooding behavior to reduce the permeability in the diluted regions to a much greater extent and to inject the alginate solution to a far greater depth into these regions than into the petroleum containing regions. Consequently, the inflow of oil is considerably increased due to the increased pressure gradient. It may therefore be expected that the petroleum content of the produced fluids is even more favorable than would appear from the change of the mobility ratio.

In order to achieve this effect, the alginate concentration should be selected to place the viscosity of the solution significantly above that of water and significantly below that of the crude oil. In some cases it may be advantageous to admix an alkali metal salt to the alginate whereby at a given concentration the viscosity of the solution is reduced. Table I specifies viscosities of the trademarked sodium alginate PROTANAL ® LF (50 cps), manufactured by Protan & Fagertun A.S., Drammen/Norway, as a function of the concentration for fresh water and a 2% solution of potassium chloride as mixing water at two temperatures and a shear rate of $10\ s^{-1}$.

TABLE I

| | VISCOSITY (mPa · s) (of PROTANAL ® LF (50 cps) shear rate $10\ s^{-1}$) | | | |
|---|---|---|---|---|
| | at 25° C. | | at 60° C. | |
| | mixing water | | | |
| Concentration (kg/m³) | Fresh Water | 20 g/l KCl water | Fresh Water | 20 g/l KCl Water |
| 1 | 2.9 | 1.5 | 1.5 | .8 |
| 2 | 4.3 | 2.2 | 2.2 | 1.1 |
| 3 | 5.8 | 2.9 | 2.8 | 1.5 |
| 5 | 9.5 | 5.5 | 4.5 | 2.6 |
| 10 | — | 19.9 | — | 7.9 |

In the following tests the influence of the alginate treatment on the effective permeabilities to oil and water and on the mobility ratio was investigated. Linear cells packed with sand and ground core material, respectively, were filled with water from the Dogger field in West Germany as connate water and were then flooded with oil of varying viscosities. When the nonreducible water content was reached, the effective permeability to oil, $k_1$ eff o, was determined. Subsequently, the oil was driven out with Dogger water and the effective permeability to water, $k_1$ eff w, was determined. The Dogger water had an overall salt content of 176 g/l and a content of Ca and Mg of 4.5 g/l and 0.9 g/l, respectively. After the effective permeabilities had been determined, the linear cells were injected at typical formation temperatures with solutions of sodium alginate of varying concentrations, partly with sodium hexametaphosphate, then flooded, and the effective permeabilities to water and oil, $k_2$ eff w and $k_2$ eff o, were again determined.

illustrative only and are not intended as limitations on the scope of the invention.

TABLE II

| | | | | | Results of Water Blocking on Linear Flood Pipes | | | | | | |
|---|---|---|---|---|---|---|---|---|---|---|---|
| | | Alginate | | Viscosities | Prior to Treatment | | | After Treatment | | | |
| Ex. No. | Temp. (°C.) | Concentr. (g/l) | Phosp. Conc. | Water Oil (mPa·s) | $k_1$ eff w ($\mu m^2$) | $k_1$ eff o | $M_1$ | $k_2$ eff w ($\mu m^2$) | $k_2$ eff o | $M_2$ | $M_1/M_2$ |
| 1 | 60 | 20 | — | .700  2.44 | 1.7 | 4.1 | 1.45 | 0.0 | — | — | — |
| 2 | 47 | .5 | — | .835  3.24 | 1.68 | 4.3 | 1.52 | .37 | 1.96 | .73 | 2.07 |
| 3 | 47 | 1 | 1 | .835  3.24 | .75 | 5.06 | .58 | .094 | 1.72 | .21 | 2.71 |
| 4 | 58 | 3 | 1 | .745  2.48 | .26 | .45 | 1.92 | .025 | .25 | .33 | 5.78 |
| 5 | 58 | 3 | 1 | .745  2.48 | 1.44 | 3.46 | 1.38 | .051 | .70 | .24 | 5.71 |
| 6 | 58 | 3 | — | .745  2.98 | .145 | .294 | 1.97 | .015 | .117 | .51 | 3.85 |
| 7 | 60 | 1 | — | .700  2.50 | 2.62 | 6.11 | 1.53 | .19 | 1.69 | .40 | 3.81 |

The data for the experimental runs are listed in Table II. The permeabilities are specified in terms of $\mu m^2$ (Darcy). Example 1 was a prototype for complete blocking of bottom water as in the prior art. The treatment at a very high alginate concentration of 20 g/l reduced the effective permeability to water substantially to zero. For Examples 2-7, the mobility ratios $M_1$ and $M_2$ before and after the alginate treatment, respectively, and the associated effective permeabilities to water and oil are specified.

Surprisingly, it has been found that the alginate treatment reduces the effective permeability to water to a much greater extent than the effective permeability to oil, so that a selective blocking of water has occurred. For instance, in Example No. 4 the effective permeability to water is reduced by the treatment by a factor of 10.4, whereas the effective permeability to oil is reduced only by a factor of 1.8. The mobility ratio in this test before and after the treatment with the alginate solution is correspondingly improved by a factor of 5.78. And the effectiveness of the treatment in the field would be even greater than the change in the mobility ratio would indicate since the treating solution would penetrate much farther into the water layers than into the predominantly oil producing layers.

In practice, the amount of alginate solution will be selected so that a radius of about 0.5 to 5 meters, preferably of about 1 to 3 meters around the well will be covered by the treating liquid. The alginate has to be protected from bacteriolysis by means of a suitable bactericide.

Many other variations and modifications may be made in the concepts described above by those skilled in the art without departing from the concepts of the present invention. Accordingly, it should be clearly understood that the concepts disclosed in the description are

What is claimed is:

1. A method of treating a producing well penetrating a hydrocarbon formation to reduce the formation permeability to water substantially more than the permeability to oil, comprising injecting into the well an aqueous solution of about 0.1 to about 5.0 grams of alginate per liter.

2. The method of claim 1, wherein the alginate solution contains at least about two grams per liter of multivalent cations.

3. The method of claim 1, further comprising the injection of an aqueous solution containing at least about two grams per liter of multivalent cations into the well after the injection of the alginate solution.

4. The method of claim 3, wherein the treating method is repeated by injecting an alginate solution followed by a multivalent cation solution following the initial injection of the alginate and multivalent cation solution.

5. The method of claim 1, wherein the alginate solution contains about 0.1 to about 10 grams per liter of sodium hexametaphosphate or sodium tripolyphosphate.

6. The method of claim 1, further comprising the injection of water after the alginate solution to drive the alginate solution into the formation, said water containing less than about one gram per liter of multivalent cations, and followed by the injection of an aqueous solution of at least about two grams per liter of multivalent cations.

7. A method of treating a producing well penetrating a hydrocarbon formation to reduce the formation permeability to water substantially more than the permeability to oil, comprising injecting an aqueous solution of about 0.1 to about 5 grams of alginate per liter into all fluid producing layers of the formation.

* * * * *